United States Patent [19]

Geffcken et al.

[11] Patent Number: 4,527,100
[45] Date of Patent: Jul. 2, 1985

[54] FLAT COLOR PICTURE REPRODUCTION OR VIDEO DISPLAY DEVICE

[75] Inventors: Walter Geffcken, Munich; Burkhard Littwin, Hohenschäftlarn, both of Fed. Rep. of Germany

[73] Assignee: Siemens Aktiengesellschaft, Berlin and Munich, Fed. Rep. of Germany

[21] Appl. No.: 534,589

[22] Filed: Sep. 22, 1983

[30] Foreign Application Priority Data

Sep. 28, 1982 [DE] Fed. Rep. of Germany ....... 3235894

[51] Int. Cl.$^3$ ........................ H01J 29/70; H01J 29/72
[52] U.S. Cl. ..................................... 315/366; 313/422
[58] Field of Search .......................... 315/366; 313/422

[56] References Cited

U.S. PATENT DOCUMENTS 2,742,555  3/1978  Watanabe et al.
4,408,143 10/1983  Inohara et al. ...................... 315/366
4,417,184 11/1983  Takesako et al. ................... 313/422

*Primary Examiner*—Theodore M. Blum
*Attorney, Agent, or Firm*—Herbert L. Lerner; Laurence A. Greenberg

[57] ABSTRACT

Flat picture reproduction device for displaying color pictures based upon three basic colors, containing a vacuum-tight envelope with an electrode matrix formed of row conductors and column conductors arranged in front of the row conductors. It has cutouts at the intersections of the row and column conductors and divides the interior of the envelope into a rear and a front chamber. A planar electron source is located in the rear chamber, elongated deflection electrodes located in the front chamber, between adjacent column conductors. The odd-numbered deflection electrodes are connected to a first voltage source, and the even-numbered ones to a second voltage source. Strip-shaped layers of luminescent phosphor is applied to the front side of the envelope wall adjacent one another in a periodic color sequence parallel to the column conductors. An addressing circuit is provided which has means for scanning the row conductors sequentially, and means for providing the column conductors, during a row scanning time interval and in the sequence of colors, with white dot information potentials in a manner that electrons supplied by the electron source can pass selectively through the cutouts formed in the electrode matrix, and means for applying different potentials to the deflection electrodes so that the electrons entering the front chamber are directed to the respective luminescent strips having the correct color.

4 Claims, 4 Drawing Figures

FLAT COLOR PICTURE REPRODUCTION OR VIDEO DISPLAY DEVICE

The invention relates to a picture reproduction device and, more particularly, to such a device which includes a vacuum type envelope with an electrode matrix formed of row conductors and column conductors arranged in front of the row conductors, and having cutouts at intersections thereof and subdividing the interior of the envelope into a rear and a front chamber, a planar electron source located in the rear chamber, deflection electrodes located in the front chamber, a respective one of the deflection electrodes extending between adjacent column conductors, the odd-numbered ones of the deflection electrodes being connected to a first voltage source, and the even-numbered ones thereof to a second voltage source, and strip-shaped layers of fluorescent phosphor applied to the front side of the envelope wall and being luminescent upon electron excitation in a respective one of the three basic colors, the layers lying adjacent one another in a periodic color sequence parallel to the column conductors; an addressing circuit having means for scanning the row conductors sequentially, means for providing the column conductors, during a respective row scanning time interval and in the sequence of colors, with appertaining white dot information signals in a manner that electrons supplied by the electron source can pass selectively through the cutouts formed in the electrode matrix, and means for applying different potentials to the deflection electrodes in sychronism with the color change so that the electrons entering the front chamber are directed to the respective luminescent strips having the correct correspondingly color. The white dot is defined as the point of the electrode matrix that has been selected by white dot information as the point upon which the electrons are impinging.

With increasing density of picture elements in becomes more and more difficult to keep the control elements disposed in the interior of the display free of defects. This applies primarily to picture screens wherein electrons are drawn forward from a rear space by selectively opened holes or cutouts of a control structure, and are subsequently brought to a fluorescent screen. It is particularly critical, in such a case, to form the hole matrix of the control unit which, not infrequently, includes several electrode planes and insulating partitions, so error-free at all locations that practically the same geometrical and electrical conditions prevail over the entire display panel.

Because of these technological problems it has already been considered to place a relatively coarse raster of openings into the control structure and to effect the required fine resolution by post-deflection of the electrons that have passed through the electrode matrix.

If colored pictures based upon three basic colors are to be displayed with such a hybrid technique, it is advisable to generate one electron beam per white dot and to let this beam scan the three color components of the white dot. For this purpose, German Published Non-Prosecuted patent application (DE-OS) 27 42 555 proposes the following construction: each column of the electrode matrix is followed by deflection electrodes; the information is entered line-sequentially and specifically so that, while a row is being addressed, the three color separations of the complete line information are sequentially fed to all columns; the deflection electrode pairs are connected, synchronously with the color change, to potentials by which they deflect the passing electron beams first to one side, then let them pass in rectlinear direction and finally deflect them to the other side; the phosphor strips hit be the electron beams are distributed on the fluorescent screen in a customary color sequence i.e. for example red-green-blue. Undoubtedly, the resolution can be improved in this manner. First tests, however, have shown that the production of the deflection system is not quite so simple; care must particularly be taken that no breakdowns occur between adjacent electrode parts.

The danger of a short circuit is less if, as provided in the aforementioned copending application, only one deflection electrode is positioned between each of the columns, and successive electrodes are alternatingly connected to a first and a second voltage source. In this case, however, adjacent electron beams are deflected in opposite directions with the result that the color sequence on the fluorescent screen must also be commutated accordingly i.e. approximately according to a red-green-blue - blue-green-red scheme, if the display is to be addressed in the usual manner. Such a uneven distribution, however, is not optimal for physiological reasons; and under unfavorable conditions, the viewer will perceive a superimposed stripe pattern.

It is therefore an object of the invention to further develop the display within the scope of the aforedescribed hybrid concept in such a manner that it has a simple post-deflection as well as an optimal color sequence and is addressed without special difficulty.

With the foregoing and other objects in view, there is provided, in accordance with the invention, a flat picture reproduction device for displaying color pictures based upon three basic colors, containing a vacuum-tight envelope with an electrode matrix formed of row conductors and column conductors arranged in front of the row conductors, and having cutouts at intersections thereof and subdividing the interior of the envelope into a rear and a front chamber, a planar electron source located in the rear chamber, deflection electrodes located in the front chamber, a respective one of the deflection electrodes extending between adjacent column conductors, the odd-numbered ones of the deflection electrodes being connected to a first voltage source, and the even-numbered ones thereof to a second voltage source, and strip-shaped fluorescent layers applied to the front side of the envelope wall and being luminescent upon electron excitation in a respective one of the three basic colors, the layers lying adjacent one another in a periodic color sequence parallel to the column conductors; an addressing circuit having means for scanning the row conductors sequentially, means for providing the column conductors, during a respective row scanning time interval and in the sequence of colors, with appertaining white dot information signals in a manner that electrons supplied by the electron source can pass selectively through the cutouts formed in the electrode matrix, and means for applying different potentials to the deflection electrodes synchronously with the color change so that the electrons entering the front chamber are directed to the respective luminescent strips having the correct correspondingly color; including a first multiplexer for serially feeding the information, which is furnished colorwise in parallel, to a shift register, the information signals of adjacent white dots following one another; a display register for receiving the information of an entire row in parallel; and a second multiplexer for receiving from said display register the three color information signals sequentially from all of the white dot information signals, and feeding them via an output stage to the respective appertaining column conductors, the adjacent column conductors receiving the color information signals in respective reverse sequence, the color sequence period of the luminescent strips being formed by the three basic colors.

In accordance with another feature of the invention the first multiplexer has means for interchanging, within successive white dot information signals the sequence of the color information signals, and the second multiplexer has means for sequentially receiving from the display register the color information signals from the respective (3n+1)th, (3n+2)th and (3n+3)th storage location (wherein n=0, ... N−1, with N=number of column conductors).

In accordance with a further feature of the invention there is provided a first counter operatively associated with the first multiplexer for receiving a line advance pulse as well as a clock pulse synchronized with the line advance pulse and having a sequence frequency 3N-times as high as that of the line advance pulse (N=number of the column conductors), and for switching the first multiplexer via two selection pulses in accordance with their respective clock pulses and a second counter operatively associated with the second multiplexer for receiving in addition to the line advance pulse, a synchronized clock having three-times the sequence frequency, and for switching the second multiplexer via two selection pulses in accordance with their respective clock pulses.

In accordance with a concomitant feature of the invention there is provided a further output stage, wherein the clock pulses of the second counter simultaneously switch the deflection electrodes via the further output stage.

The proposed solution is based on the findings that, with beam deflection in opposite directions, it is entirely possible to preserve the customary color pattern because the requirements as to signal processing are basically of such a nature that they can be solved with simple switching means. Thus, in the construction, for example, wherein two multiplexers are used, it is possible to use commercially available building blocks.

Other features which are considered as characteristic for the invention are set forth in the appended claims.

Although the invention is illustrated and described herein as embodied in a flat color picture reproduction or video display device, it is nevertheless not intended to be limited to the details shown, since various modifications and structural changes may be made therein without departing from the spirit of the invention and within the scope and range of equaivalents of the claims.

The construction and method of operation of the invention, together, however, with additional objects and advantages thereof will be best understood from the following description of specific embodiments when read in connection with the accompanying drawing in which.

Figure 1:
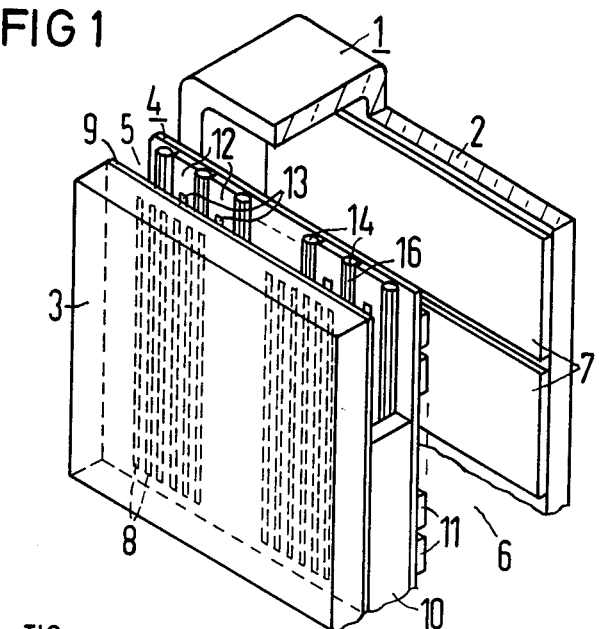
FIG. 1 is a front, side and top elevational perspective view, partly in section and partly broken away, of a flat picture reproduction or video display device according to the invention.

Referring now to the drawing and first, particularly, to FIG. 1 thereof, there is shown a flat picture screen with those parts thereof that are essential for reproducing color-television or video pictures.

In particular, the picture screen is contained within a gas-filled envelope or enclosure 1 with a back plate 2, a front plate 3 and a control plate 4 therebetween. All three parts extend in mutually parallel planes, the control-plate 4 subdividing the interior of the envelope 1 into two chambers, a forward post acceleration chamber 5 and a rear gas discharge chamber 6.

The back plate 2, on the forward side thereof, as viewed in FIG. 1, is provided with a group of mutually parallel cathode strips 7 of relatively large area. The rear side of the front plate 3 carries a regular raster of phosphor strips 8 and a post-acceleration anode 9 disposed thereover. The phosphor strips 8, which can be excited by electrons to emit light in the colors red (R) green (G) and blue (B). They are distributed on the picture screen in a periodic color sequence, each period encompassing three strips with the sequence R-G-B.

The control plate 4 which is braced against the front plate 3 by means of an intermediate spacer frame 10, has the following construction: a support plate of insulating material is provided on the back and front sides thereof with a respective group of strip-shaped mutually parallel conductors (row conductors 11 and column conductors 12, respectively). The row conductors 11 extend parallel to the cathode strips 7, and the column conductors 12 are disposed perpendicularly thereto. The support plate and the conductors 11 and 12 are pierced at intersection nodes and constitute an electrode matrix, so that electron transmission openings 13 are provided therein. Insulator rods 14, which are, respectively, provided on the front side of the electrode matrix with deflection electrodes 16 in the form of metallized strips thereon, extend between the column conductors 12.

During operation of the picture tube, the following steering potentials are applied to the individual electrodes: at the selected and the non-selected cathode strips, −200 V and 0 V, respectively; at the selected and non-selected row conductors 11, 0 V and −50 V, respectively; at the selected and non-selected column conductors 12, −80 V and −30 V respectively; at the deflection electrodes, −100 V or at the even-numbered deflection electrodes, −150 V and at the odd-numbered ones, −50 V or, likewise spatially alternating, −50 V and −150 V; and at the post-acceleration anode 9, +4 kV. The row conductors 11 are selected sequentially i.e. are raised sequentially to the voltage from 0 V to −50 V. The cathode voltages are synchronized with the row deflection voltage in such a way that, in the line row advance sequence, a plasma arc stands between, respectively, the selected row (row corresponds to line in the picture) conductor and the cathode strip which happens to be located opposite to it. The column conductors 12, during the time wherein a given line or row conductor is addressed, successively receive all three color components of the corresponding white dot information, and specifically in a sequence which changes from column conductor to column conductor. The voltages for the deflection electrodes are varied in synchronism with the color change.

Figure 2:
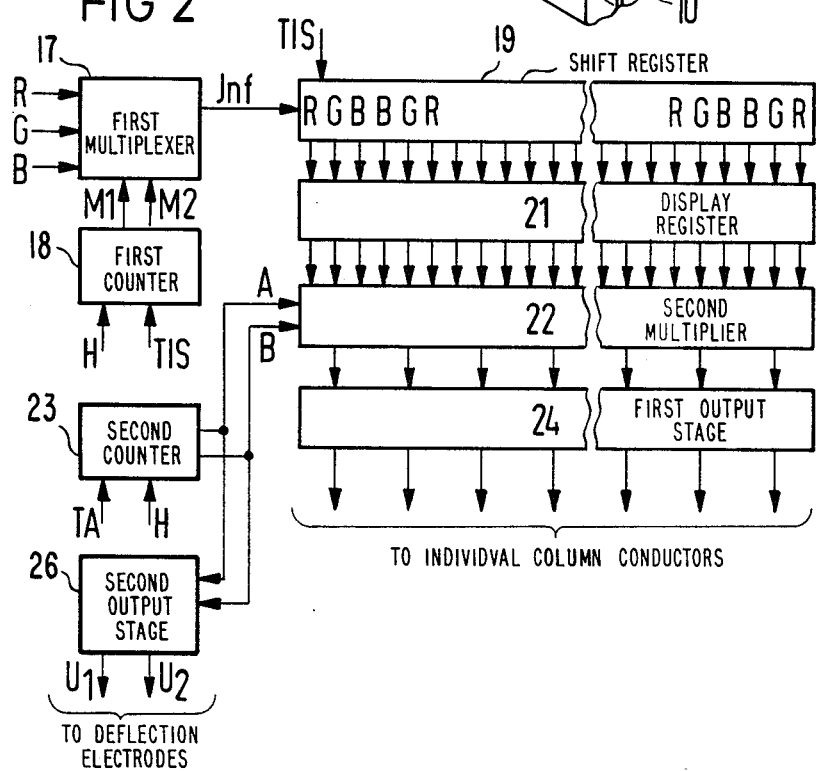
FIG. 2 is a block circuit diagram showing an addressing unit which is formed of column conductors and deflection electrodes.
Figure 3:
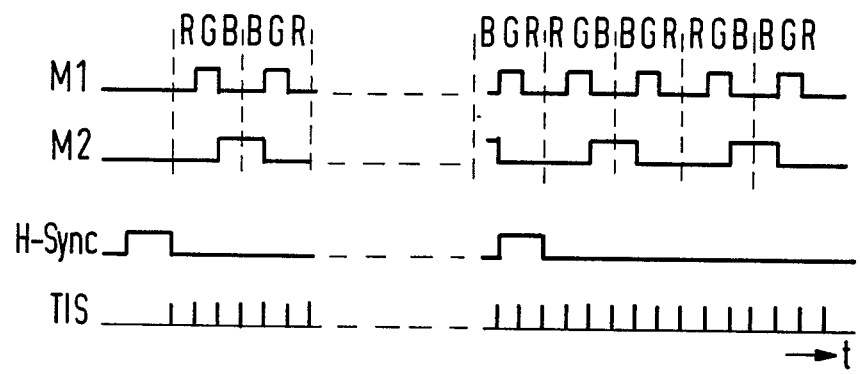
FIGS. 3 and 4 are timing diagrams for the addressing unit of FIG. 2.
Figure 4:
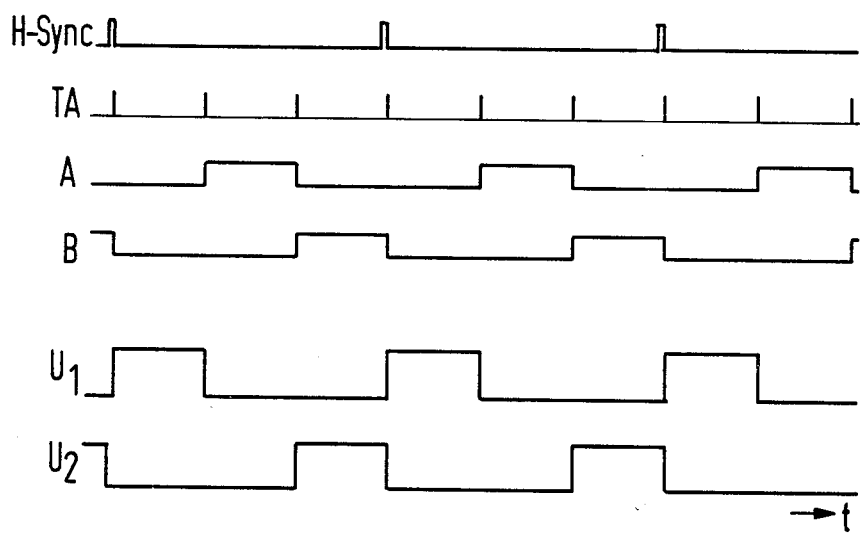

The required addressing circuit is known per se as far as the advancing of the lines and cathodes is concerned. On the other hand, the manner of information processing is new, as well as the control of the deflection electrodes synchronized therewith. The example of FIGS. 2 and 4 shows how this can be accomplished for the typical case wherein the information to be displayed is disposed in parallel on respective lines for red, green and blue. A multiplexer 17 with an appertaining counter 18 converts the parallel information into serial information. The individual signals are interlaced in such a manner that information for adjacent white dots follow one another and the sequence of the three color signals in each white-dot information is reversed from triplet to triplet. The counter 18 receives the line advance pulse "H-Sync" as well as the pulse "TIS" (FIG. 3). The sequence frequency of the pulse TIS is 3N-times the H-Sync pulse (N=number of the column conductors). From these pulses, the counter 18 forms two selection pulses M1 and M2 by which it controls the switch positions of the multiplexer 17. The serial line information is shifted into a shift register 19 and then received in parallel by a display register 21. A further multiplexer 22 with a counter 23 connected thereto selects, from the information present in the display register 21, the first, second and third color component of each white dot. The associated counter 23 receives, in addition to the pulse H-Sync, the pulse "TA" which has a clock frequency three times a high as the line advance frequency (FIG. 4). From these pulses, the counter 23 forms selection pulses A and B for switching the multiplexer 22. The information delivered by this multiplexer is then fed via an output stage 24 to the individual column conductors. The selection signals A and B, besides controlling the multiplexer 22, further control, via an output stage 26, the deflection electrodes 16, the odd-numbered and the even-numbered electrodes of which are respectively connected to an output of the output stage 26. The potentials $U_1$, $U_2$ which are present at the two outputs are shown in the diagram of FIG. 4.

The invention is not limited to the embodiment shown because, in the case at hand, the objective is essentially only not to rearrange the color dots on the picture screen in the transition from a beam deflection in the same direction to a beam deflection in the opposite direction, but rather to rearrange the circuit operation. Thus, the necessary interchanging operations could be performed by the second multiplexer 22 instead of the first multiplexer 17. Apart from that, the invention offers considerable further latitude also with respect to the construction details. For example, it does not matter whether the electrons are generated by a gas discharge or in some other manner. No special role is played also by the shape of the control plate, the openings of which may also be "covered-up" entirely. Finally, the construction of the deflection system itself is of no decisive importance. The deflection electrodes could also be formed of stretched wires and/or drawn forward relative to the control lines, for example, somewhat in the form of strips which are applied by a film technique to the front side of a further hole plate and extend into the holes.

The foregoing is a description corresponding, in substance, to German application P 32 35 894.6, dated Sept. 28, 1982, International priority of which is being claimed for the instant application, and which is hereby made part of this application. Any material discrepancies between the foregoing specification and the specification of the aforementioned corresponding German application are to be resolved in favor of the latter.

There are claimed:

1. Flat picture reproduction device for displaying color pictures based upon three basic colors comprising:
   (a) a vacuum-tight envelope defining an interior,
   (b) an electrode matrix formed of row conductors and column conductors arranged in front of the row conductors, and having cutouts at intersections thereof and subdividing the interior of the envelope into a rear and a front chamber,
   (c) a planar electron source located in the rear chamber,
   (d) elongated odd and even numbered vertical deflection electrodes located in the front chamber, a respective one of the deflection electrodes extending between adjacent column conductors, the odd-numbered ones of the deflection electrodes being connected to a first voltage source, and the even-numbered ones thereof to a second voltage source, and
   (e) strip-shaped layers of fluorescent phosphor applied to the front inside of the envelope wall and being luminescent upon electron excitation in a respective one of the three basic colors, the layers disposed adjacent one another in a periodic color sequence the layers being parallel to the column conductors;
   (f) an addressing circuit having means for scanning the row conductors sequentially, means for providing the column conductors, during a respective row scanning time interval and in the sequence of colors, with appertaining white dot information potentials in a manner that electrons supplied by the electron source can pass selectively through the cutouts formed in the electrode matrix, and means for applying steering potentials to the deflection electrodes synchronously with the color change so that the electrons entering the front chamber are directed to the respective luminescent layers having the corresponding correct color; the addressing circuit which comprises:
   (g) a first multiplexer, which receives in parallel the color information for each white dot and which in response transmits serially the color information to a shift register, the color information potentials of adjacent white dots following one another;
   (h) a display register for receiving the information of an entire row at the time in parallel; and
   (i) a second multiplexer for receiving from said display register the three color information potentials sequentially from all of the white dot information potentials and feeding them via a first output stage to the respective individual appertaining column conductors, so that said adjacent column conductors receive said three color information potentials in alternatingly reverse sequence, the color sequence period of the luminescent layers being formed by the three basic colors.

2. Device according to claim 1, wherein said first multiplexer has means for interchanging, within the sequence of successive white dot information potentials, the sequence of the color information potentials and said second multiplexer has means for sequentially receiving from said display register the color information potentials from the respective (3n+1)th, (3n+2)th storage location (wherein n=0, ... N−1, with N=number of column conductors).

3. Device according to claim 2, including a first counter operatively associated with said first multiplexer for receiving line advance pulses as well as clock pulses synchronized with said line advance pulses and having a sequence frequency 3N-times as high as that of said line advance pulses, said first multiplexer switching in response to alternating selection pulses in accordance with said clock pulse, and a second counter operatively engaging said second multiplexer for transmitting, in addition to said line advance pulses, synchronized clock pulses having three-times the sequence frequency, and for switching said second multiplexer in response to two selection pulses in accordance with said clock pulse thereof.

4. Device according to claim 3, including a second output stage, the clock pulses of said second counter simultaneously switching said deflection electrodes in response to said second output stage.

* * * * *